United States Patent

Garney et al.

[11] Patent Number: 6,101,613
[45] Date of Patent: Aug. 8, 2000

[54] ARCHITECTURE PROVIDING ISOCHRONOUS ACCESS TO MEMORY IN A SYSTEM

[75] Inventors: John I. Garney, Aloha; Brent S. Baxter, Hillsboro, both of Oreg.

[73] Assignee: Intel Corporation, Santa Clara, Calif.

[21] Appl. No.: 09/215,558

[22] Filed: Dec. 18, 1998

Related U.S. Application Data

[63] Continuation-in-part of application No. 09/110,344, Jul. 6, 1998.

[51] Int. Cl.$^7$ .................................................. G06F 1/04
[52] U.S. Cl. ................................ 713/600; 710/54; 710/61
[58] Field of Search ..................................... 713/600, 601; 710/117, 58, 54, 55, 56, 61; 709/225, 200, 231; 370/232, 395, 89; 712/8, 9, 206; 714/746

[56] References Cited

U.S. PATENT DOCUMENTS

| | | | |
|---|---|---|---|
| 4,637,014 | 1/1987 | Bell et al. | 370/89 |
| 5,471,474 | 11/1995 | Grobicki et al. | 370/85.2 |
| 5,621,898 | 4/1997 | Wooten | 710/117 |
| 5,640,392 | 6/1997 | Hayashi | 370/395 |
| 5,687,316 | 11/1997 | Graziano et al. | 709/200 |
| 5,761,431 | 6/1998 | Gross et al. | 709/225 |
| 5,903,702 | 5/1999 | Sugiyama et al. | 386/52 |
| 5,915,127 | 6/1999 | Ogawa et al. | 710/58 |
| 5,946,298 | 8/1999 | Okuyama | 370/232 |
| 5,960,001 | 5/1999 | Shaffer et al. | 370/448 |
| 6,018,816 | 1/2000 | Tateyama | 714/746 |

*Primary Examiner*—Joseph E. Palys
*Assistant Examiner*—Rijue Mai
*Attorney, Agent, or Firm*—Kenyon & Kenyon

[57] ABSTRACT

An architecture is provided for isochronous access to memory in a system in which a stream of information may be sent to a memory unit. The stream is divided into a plurality of service periods with a specified maximum amount of information in selected service periods, and selected service periods have a first amount of information associated with asynchronous information and a second amount of information associated with isochronous information. In addition to sending a stream of information, a request for isochronous information from the memory unit may be sent. In this case, a stream of the requested information may be received from a memory unit a predetermined number of service periods after the sending of the request. This stream is also divided into a plurality of service periods with a specified maximum amount of information in selected service periods, and each service period has a first amount of information associated with asynchronous information and a second amount of information associated with isochronous information. In either case, the second amount of information may contain asynchronous information when less than all of the second amount of information is used for isochronous information.

20 Claims, 4 Drawing Sheets

ARCHITECTURE PROVIDING ISOCHRONOUS ACCESS TO MEMORY IN A SYSTEM

CROSS REFERENCE TO RELATED APPLICATIONS

The present invention is a continuation-in-part of U.S. Pat. application Ser. No. 09/110,344, entitled "Architecture for the Isochronous Transfer of Information Within a Computer System," to John I. Garney and Brent S. Baxter, filed on Jul. 6, 1998 and assigned to Intel Corporation.

FIELD

The present invention relates to the transfer of information in a system. More particularly, the present invention relates to an architecture that provides isochronous access to memory in a system.

BACKGROUND

Memory in a computer system can be used to store information, including, for example, information that represents audio, video and multimedia content. When a transfer of information to or from memory is "asynchronous," delays can occur that interfere with timely completion of the transfer. Consider, for example, FIG. 1, which illustrates a known architecture for coupling an external Input/Output (IO) device 10 to a system 100, such as a computer system. The system 100 includes a processor 110 coupled to a main memory 200 through a memory controller 300. The external IO device 10 communicates with an 10 unit 400, which is also coupled to the main memory 200 through the memory controller 300.

Figure 1:
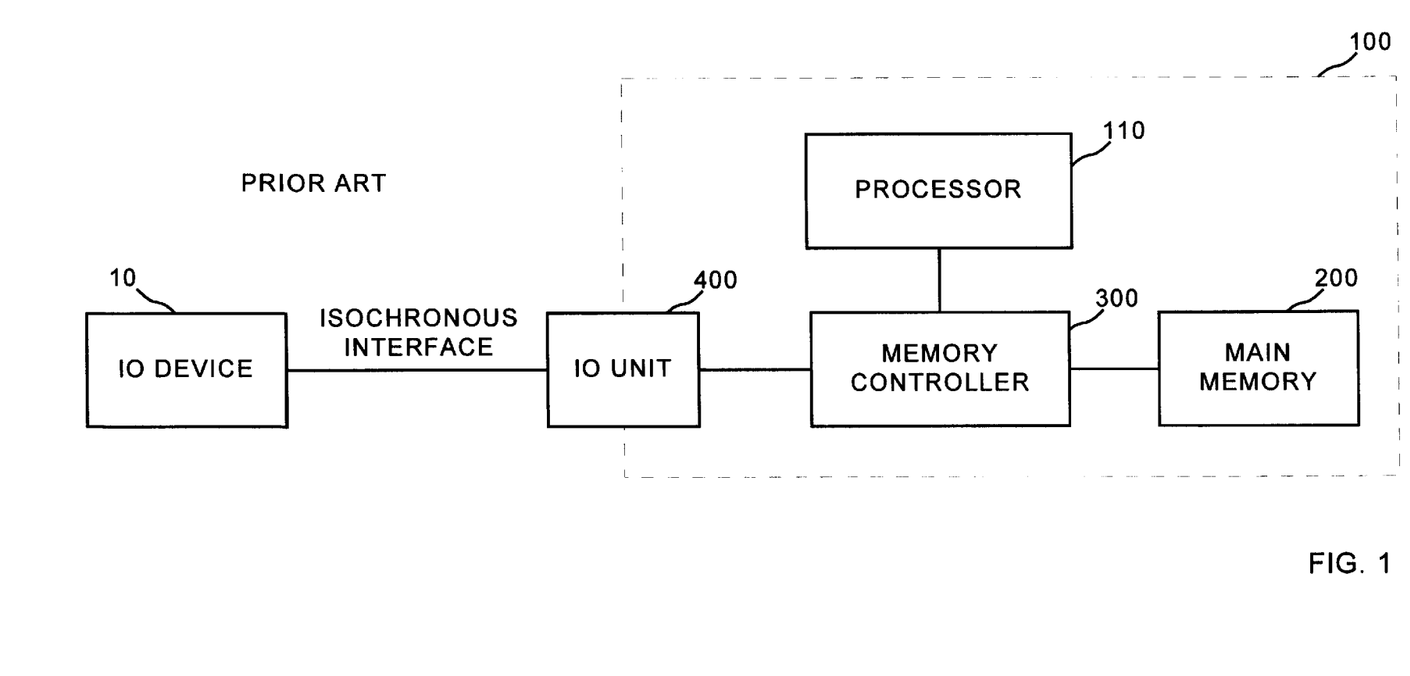
FIG. 1 illustrates a known architecture for coupling an external IO device to a computer system.

The IO device 10, such as a digital video camera acting as a sending device, may store an indication in the main memory 200, acting as a receiving device, that a "record" mode has been selected. To do so, a single asynchronous message can be sent from the IO device 10 to the system 100 in response to the selection, and the information will then be stored in the main memory 200. Typically, an asynchronous transfer of information to the main memory 200 may be delayed by other, more important, activities without adversely impacting system performance. However, even a minor delay or gap in some types of information streams may noticeably degrade the quality of the information, such as by causing a momentary freeze in a video presentation or by introducing a stuttering effect in an audio transmission.

When a transfer of information is "synchronous," the sending and receiving devices are synchronized, such as by using the same or a synchronized clock signal, and the transfer of information recurs at identical periodic intervals. For example, the IO device 10 might send a synchronous message, indicating the camera's current mode, to the system 100 once every second. However, because the IO device 10 and the system 100, or components within the system 100 such as the main memory 200, may be difficult to synchronize, a synchronous transfer of information is not appropriate in many situations.

When a transfer of information is "isochronous," the sending and receiving devices are only partly synchronized, but the sending device transfers information to the receiving device at regular intervals. Such transfers can be used, for example, when information is to arrive at the receiving device at the same rate it is sent from the sending device, but without precise synchronization of each individual data item. For example, the IO device 10 may send an isochronous stream of video information to the system 100 which ensures that the information flows continuously, and at a steady rate, in close timing with the ability of the system 100 to receive and display the video. While a synchronous transfer of information occurs at the same time with respect to a clock signal, an isochronous transfer of information may require that up to "X" bits of data be transferred every "T" time units, although precisely when the X bits are transferred within the time T can vary. The IEEE 1394 standard (1995), entitled "High Performance Serial Bus" and available from the Institute of Electrical and Electronic Engineers, is an example of an interface that supports the isochronous transfer of information.

In addition to the isochronous transfer of information between the IO device 10 and the system 100, the transfer of information within the system 100 may also be isochronous. U.S. patent application Ser. No. 09/110,344, entitled "Architecture for the Isochronous Transfer of Information Within a Computer System," to John I. Garney and Brent S. Baxter, filed on Jul. 6, 1998 and assigned to Intel Corporation discloses an architecture that provides for the isochronous transfer of information within the system 100.

Even if the transfer of information within the system 100, such as between the 10 unit 400 and memory controller 300, is isochronous, the information may still not be transferred with the main memory 200 in an isochronous fashion. This is because the transfer of information between the memory controller 300 and the main memory 200 is typically asynchronous in nature. That is, even though information is transferred from the IO device 10 to the memory controller 300 in an isochronous way, the information is treated in an asynchronous way when transferred with the main memory 200. For example, when an "agent," such as the processor 110, accesses the main memory 200, a delay or gap in an isochronous stream being sent from the IO device 10 to the main memory 200 may occur. If so, the benefits of using an isochronous stream of information, such as, for example, making sure that information flows continuously, and at a steady rate, in close timing with the ability of the system 100 to receive and display the image, are reduced or lost altogether.

To solve this problem, a large data buffer, such as a First-In, First-Out (FIFO) data buffer, can be provided to store isochronous information when the main memory 200 cannot be accessed. In this case, information being transferred, for example, between the IO device 10 and the main memory 200 can be stored to, or retrieved from, the buffer when the main memory 200 is not available. This buffering can reduce the delays or gaps in an isochronous stream within the system 100, such as those caused by, for example, traditional cache coherence management or memory arbitration. Such a buffer, however, may increase the cost, lower the performance and/or make the system 100 more difficult to build, validate and test. Moreover, unless these problems are solved, the system may still not deliver information to or from the main memory 200 in a reliable and timely fashion.

SUMMARY

In accordance with an embodiment of the present invention, an isochronous stream of information is sent to a memory unit. The stream is divided into a plurality of service periods, and selected service periods contain no more than a specified maximum amount of isochronous information.

In accordance with another embodiment of the present invention, an isochronous stream of requests is sent to a memory unit. The stream of requests is divided into a plurality of first service periods, and selected first service periods contain no more than a specified maximum amount of requests.

BRIEF DESCRIPTION OF THE DRAWINGS

The present invention is illustrated by way of example, and not limitation, in the FIGS. of the accompanying drawings, in which like references indicate similar elements and in which.

DETAILED DESCRIPTION

Figure 2:
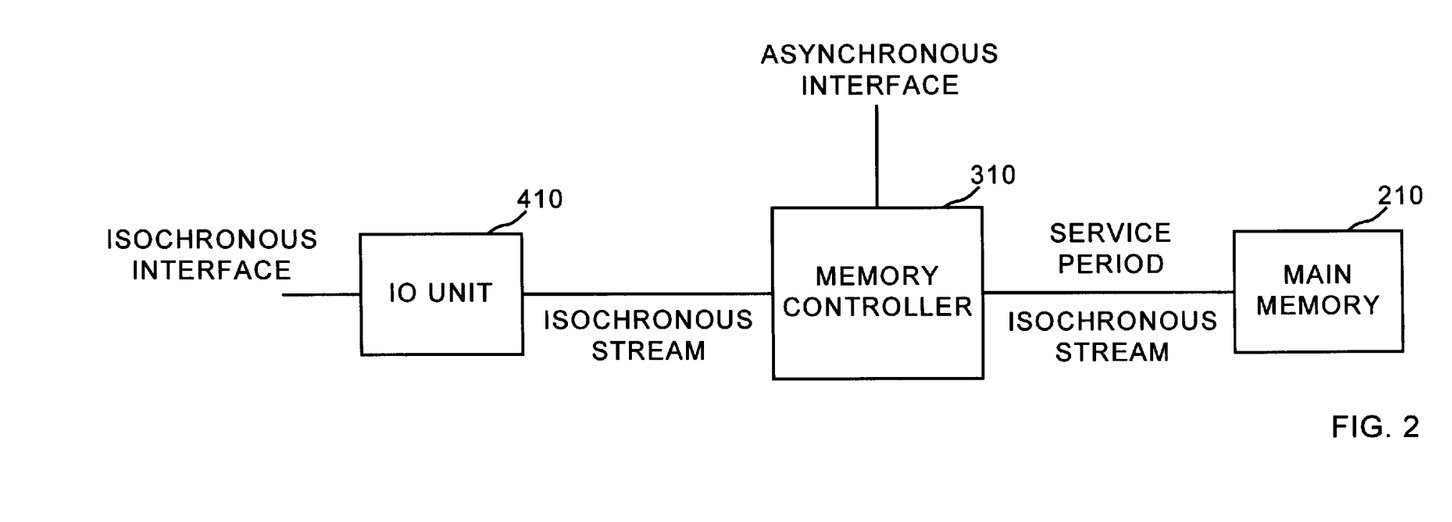
FIG. 2 is a block diagram of a computer system according to an embodiment of the present invention.

An embodiment of the present invention is directed to an architecture that provides isochronous access to memory in a system. Referring now in detail to the drawings, there is shown in FIG. 2 a block diagram of a computer system according to an embodiment of the present invention. An isochronous stream of information may be transferred between, for example, an external device (not shown in FIG. 2) and an 10 unit 410. Within the computer system, the information is transferred between a memory controller 310 and a main memory 210. As is known in the art, the main memory 210, may include, for example, a Dynamic Random Access Memory (DRAM) array. According to an embodiment of the present invention, the transfer of information between the memory controller 310 and the main memory 210 is also isochronous.

Figure 3:
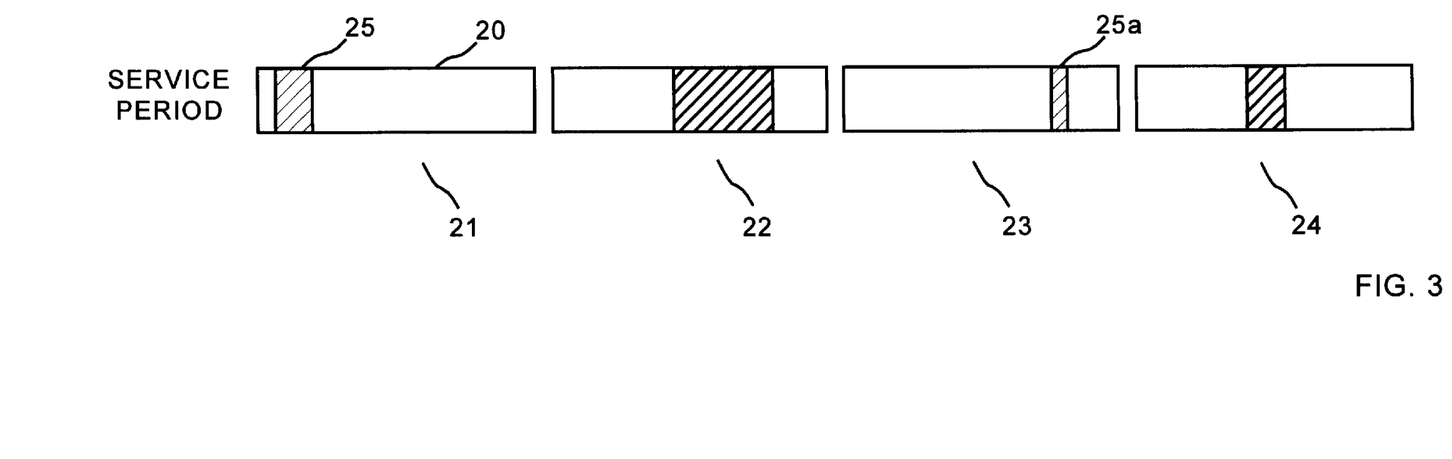
FIG. 3 illustrates the use of a service period according to an embodiment of the present invention.

As used herein, information may be "transferred" with the main memory 210 by sending the information to, or receiving the information from, the main memory 210. Consider first a transfer of information to the main memory 210. The memory controller 310 may receive both isochronous information, such as from the 10 unit 410, and asynchronous information, such as from a processor (not shown in FIG. 2), to be stored in the main memory 210. According to an embodiment of the present invention, the memory controller 310 sends a stream of combined information to the main memory 210, and the combined stream is divided into a plurality of "service periods." FIG. 3 illustrates the use of a service period according to an embodiment of the present invention. The stream is divided into service periods 21, 22, 23, 24 of, for example, equal duration in one embodiment of the present invention. Each service period has a first "duration" 20, or amount of information, shown as the white portion in FIG. 3, associated with asynchronous information. Each service period also has a second duration 25 or amount of information, shown as the shaded portion in FIG. 3, associated with isochronous information. Although each service period has a single isochronous portion 25, exactly where in the service period the isochronous amount of information 25 falls varies from service period to service period in one embodiment of the present invention. Further, the length of the isochronous duration 25 may vary from service period to service period in an embodiment of the present invention.

The main memory 210 accepts a specified amount of data from an isochronous stream during a repetitively scheduled time. Thus, an isochronous pathway to the main memory 210 is effectively guaranteed, and each isochronous access will be completed on time regardless of other asynchronous memory traffic in this embodiment. Timing and control logic may be used to determine when, within a service period, an isochronous access can no longer be deferred and should be given priority. For example, the memory controller 310 may receive a number of different isochronous streams of information destined for the main memory 210, all such isochronous streams having been previously merged into a single isochronous stream, which may then treated as described above.

Consider now a transfer of information from the main memory 210. As before, information is transferred to the memory controller 310 from the main memory 210 as a stream divided into a plurality of service periods, and each service period has an amount of information associated with asynchronous information and an amount of information associated with isochronous information.

According to an embodiment of the present invention, a request for information from the main memory 210 is generated. The isochronous information associated with the request is then received from the main memory 210 a known number of service periods after the sending of the request. In this way, returning read data may be provided a precisely specified number of service periods after the corresponding read request, in this embodiment.

For example, assuming a two service period latency, if the request was sent during the first service period 21, the information may be received from the main memory 210 during the isochronous amount of information 25a of the third service period 23 in this embodiment. Although a "two service period" isochronous memory latency is used in this example, any predetermined number of service periods may be used instead, depending on the objectives and capabilities of the system.

With respect to another embodiment, both the sending of information to and the receipt of information from the main memory 210 in another embodiment, the memory controller 310 may also allow asynchronous information to be transferred during the isochronous amount of information 25 of a service period if not all of the isochronous amount of information 25 is being used for isochronous information. This may allow, for example, traditional asynchronous memory traffic, such as from a microprocessor or Peripheral Component Interconnect (PCI) device, during any "unused" time in the isochronous amount of information 25, although the invention is not limited in scope in this respect. One or more isochronous streams of information can be transferred, for example, between the system and one or more external IO devices through an IEEE 1394 compliant interface. Other isochronous interfaces may also be used. For example, an Audio Codec 97 (AC97) compliant interface or a Universal Serial Bus (USB) compliant interface may be used to send or receive isochronous streams of information. Detailed information about the AC97 interface may be found in Audio Codec '97 Revision 2.1, dated May 22, 1998, available from Intel Corporation. Detailed specifications for the USB interface may be found in the "Universal Serial Bus Specification Revision 1.0," dated Jan. 15, 1996, Copyright ©1996, Compaq Computer Corporation, Digital Equipment Corporation, IBM PC Company, Intel Corporation, Microsoft Corporation, NEC and Northern Telecom.

Thus, in accordance with an embodiment of the present invention, a stream of isochronous information may be sent to a memory unit and the stream may be divided into a plurality of service periods with a specified maximum amount of information in a service period. A service period may have a first duration associated with asynchronous information and a second duration associated with the isochronous information. The memory unit accepts the maximum amount of isochronous information during a service period, and may also accept whatever asynchronous information it can in the remainder of the service period in such an embodiment.

Similarly, in accordance with an embodiment of the present invention, a stream of isochronous information requests may be sent to a memory unit and a stream of isochronous information may be received from the memory unit. Each stream may be divided into a plurality of service periods with a specified maximum amount of requests and information in a service period. A service period may have a first amount of information associated with asynchronous information and a second amount of information associated with the isochronous information.

The memory unit accepts the maximum amount of isochronous information during a service period. The memory unit may also accept whatever asynchronous information requests and generates whatever amount of asynchronous information it can in the remainder of the service period in such an embodiment.

According to another embodiment of the present invention, the memory controller 310 may translate one or more of these streams into an isochronous stream of information to be sent to the main memory 210 at a rate substantially the same as the rate at which the other stream or streams transfer information, although the invention is not limited in scope in this respect.

Assume, for example, that the memory controller 310 receives an isochronous stream of information at a given rate of 25 Megabits per second (Mbps). If the information originated from an IEEE 1394 compliant interface, the stream may, for example, comprise a plurality of 125 $\mu$sec packet frames, and each packet frame may contain a time slot with 3,125 bits. Note that transferring 3,125 bits in each 125 $\mu$sec period comprises a data rate of 25 Mbps.

The memory controller 310 may translate the received isochronous stream of information into a new isochronous stream of information to be sent to the main memory 210. This stream may transfer information at a rate of 25 Mbps, as did the first stream. However, each service period associated with the stream may have a different amount of information, such as 10 $\mu$sec, and contain a different amount of information, such as 250 bits. Note that transferring 250 bits in each 10 $\mu$sec period also comprises a data rate of 25 Mbps.

The new X-T contract may be more appropriate for the main memory 210 than the X-T contract originally associated with an IEEE 1394 compliant interface. For example, if the system is to frequently refresh the main memory 210, and/or let another agent, such as a processor, gain access to the main memory 210, it may be desirable to limit the amount of information to be sent as a unit to the main memory 210. Moreover, without such a translation, a buffer may be large enough to store 3,125 bits of information. With the translation, a buffer may store 250 bits of information. Thus, by reducing the X and T in the X-T contract, smaller, and therefore less expensive, buffers may be used.

Figure 4:
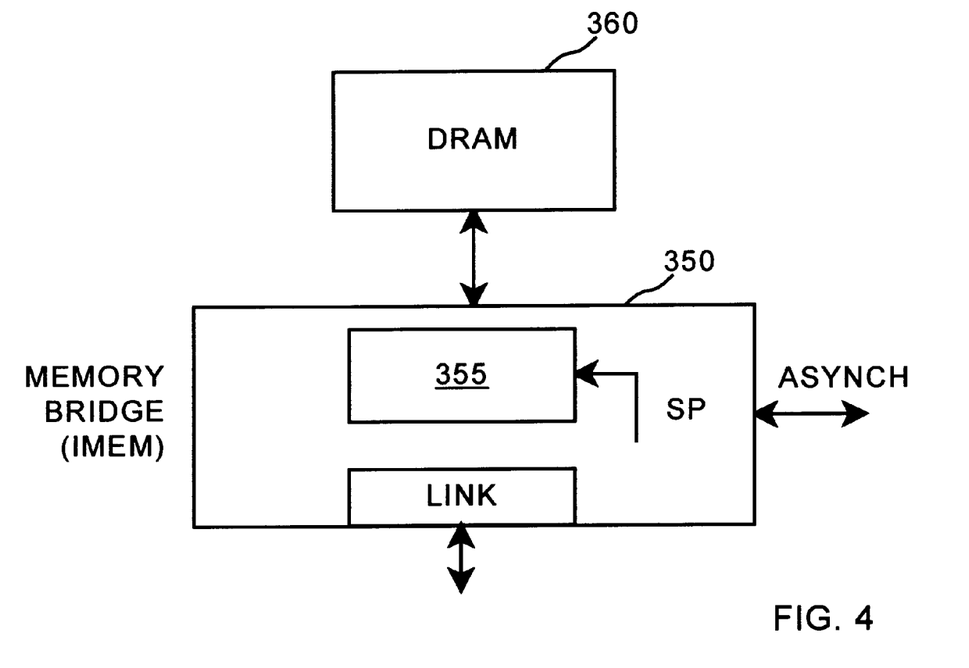
FIG. 4 is a block diagram of a memory architecture according to an embodiment of the present invention.

FIG. 4 is a block diagram of a memory architecture according to an embodiment of the present invention. As will be described, an embodiment of the present invention provides a fixed time period, isochronous, bidirectional memory pipeline. An isochronous memory bridge (IMEM) 350 transfers both (1) asynchronous information and (2) isochronous information from, for example, an isochronous IO bridge (not shown in FIG. 4). The isochronous information may, for example, be transferred through a link and, originate from, or be destined for, one or more external IO devices. For example, isochronous streams of information from one or more USB compliant ports and/or one or more AC97 compliant ports may pass through the IO bridge and/or another device that may combine, and/or divide, bandwidth among multiple isochronous interconnects.

The memory bridge 350 includes a "rate matcher" 355. As used herein, the phrase "rate matcher" simply refers to a device that translates a first isochronous stream of information, having a first service period, into a second isochronous stream of information, having a second service period. For example, an information buffer may serve as one type of rate matcher. In this case, a stream having, for example, an X-T contract to deliver 10 bits of information in each one second period may be translated into a stream having an X-T contract to deliver 20 bits of information in each two second period. This may be done by storing information in the buffer until the amount of information needed by the new X-T contract, or 20 bits, is reached. An information sub-divider may serve as another type of rate matcher. The information sub-divider may receive information with an X-T contract to deliver 20 bits of information in each two second period, and "break" the information into a stream with an X-T contract to deliver 10 bits of information in each one second period.

According to an embodiment of the present invention, the memory bridge 350 transfers information through a communication port coupled to a main memory 360, such as a DRAM array 360. The information is transferred as a stream divided into service periods. The rate matcher 355 in the memory bridge 350 translates the isochronous stream of information into a service period appropriate for the DRAM array 360 and a single isochronous stream is provided for the DRAM array 360. Moreover, the memory bridge 350 may also transfer information between a microprocessor and/or a graphics processor allowing for traditional asynchronous access to the DRAM array 360.

By way of example, the DRAM array 360 may have a 100 Mega Hertz (MHz) clock. In this case, each clock cycle has a 0.01 micro second ($\mu$sec) amount of information and 0.20 $\mu$sec, or clock cycles, might be selected as the service period amount of information. Of these 20 clock cycles, a sufficient number may be allocated to the isochronous amount of information to ensure that the specified maximum amount of isochronous information will reach the main memory 210 during each service period. Assuming that 32 bytes of information are to reach the main memory 210 in a service period, and that each DRAM access holds 16 bytes, two clock cycles may be reserved for isochronous information.

Moreover, a certain amount of overhead may be associated with isochronous access, and sufficient time may be reserved to allow for both the overhead and the actual memory transfer, although the entire overhead amount may not be required in sever service period, thus increasing the time available for asynchronous transfers. For example, clock cycles may be employed to refresh the DRAM array 360, to allow for page crossing or for Read/Modify/Write memory accesses. If 6 clock cycles are employed for this overhead, then an 8 clock cycle amount of information—6 for overhead and two for data transfer—may be reserved for isochronous access to the main memory 210. Therefore, given that a 20 clock cycle service period was selected in this embodiment, at a minimum, the remaining 12 clock cycle amount of information may be associated with non-isochronous, or asynchronous, access to the main memory 210.

Figure 5:
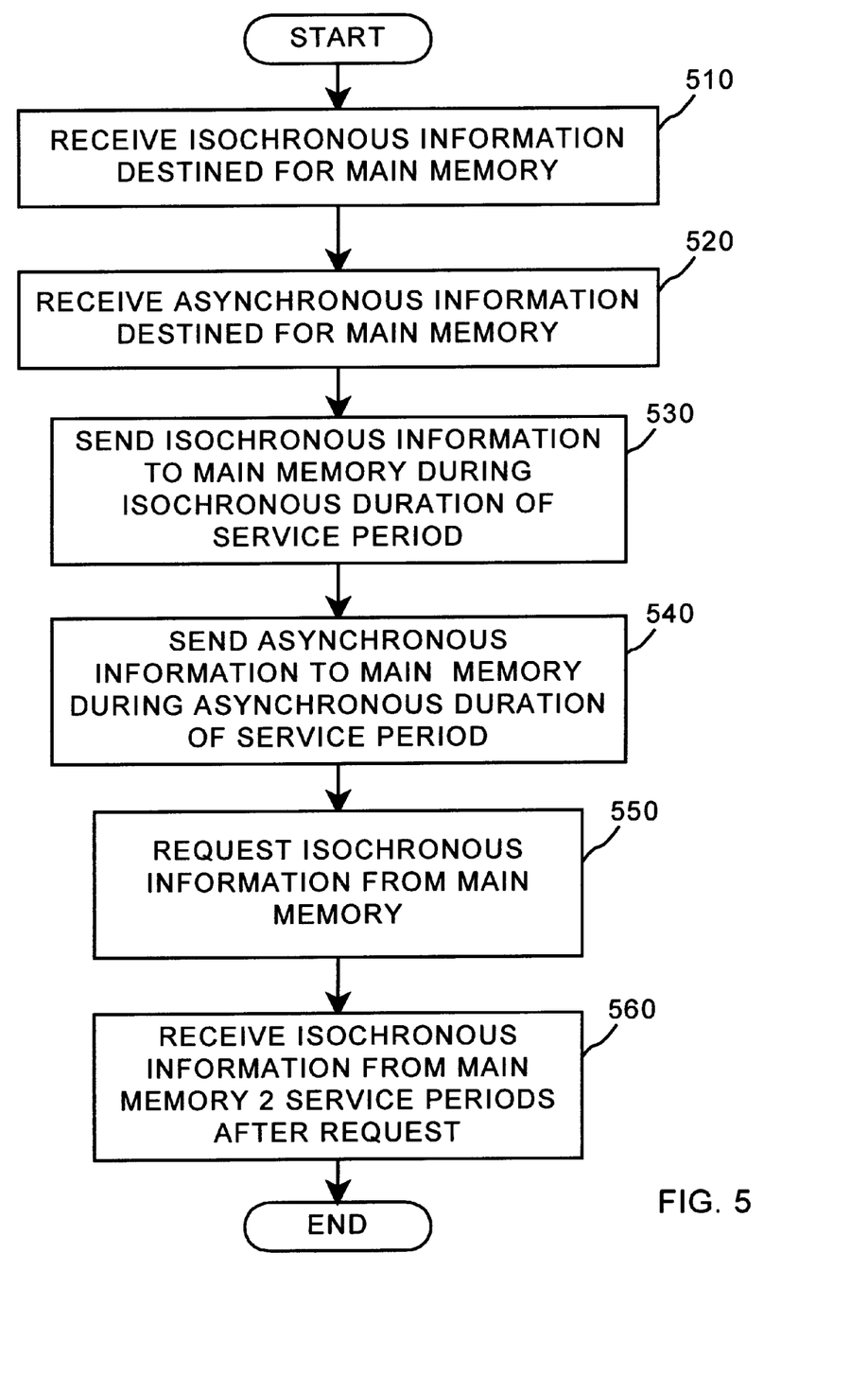
FIG. 5 is a block diagram of a method for the isochronous transfer of information with a main memory according to an embodiment of the present invention.

FIG. 5 is a block diagram of a method for the isochronous transfer of information with a main memory according to an embodiment of the present invention. After the process begins, isochronous information, destined for the main memory, is received as indicated at 510. As indicated at 520, asynchronous information destined for the main memory is also received. The isochronous information is sent to the main memory during the isochronous amount of information of a service period at 530. Similarly, the asynchronous information is sent to the main memory during the asynchronous amount of information of a service period at 540. Isochronous information is requested from the main memory at 550, and the isochronous information is received from the main memory a predetermined number of service periods, such as 2 service periods, after the request at 560.

According to the present invention, concurrent isochronous and asynchronous data transfers are provided between one or more IO devices and a shared main memory in a system. This allows a system to work with traditional asynchronous devices and with isochronous devices. It also reduces buffering in the data path between an isochronous device and the main memory, and multiple isochronous IO devices with different bandwidth requirements such that all have reliable and timely access to the main memory. The architecture permits low cost, high performance isochronous capability and still provides for more traditional asynchronous memory clients, such as a microprocessor or graphics processor.

Although a DRAM array with a 100 MHz clock was used to illustrate a specific service period example, it will be appreciated that other types of service periods will also fall within the scope of the invention. Moreover, the present invention applies to a broad range of topologies for coupling, for example, memory and other computing devices, and is therefore a general architectural approach that includes a broad range of specific implementations. In addition, although particular standards and techniques were described with respect to the isochronous transfer of information, it will be understood that the present invention is not limited to a particular standard or technique. Finally, although software or hardware are described to control certain functions, such functions can be performed using either software, hardware or a combination of software and hardware, as is well known in the art. As is also known, software may be stored, such as in memory, in the form of instructions, including micro-code instructions, adapted to be executed by a processor. As used herein, the phrase "adapted to be executed by a processor" encompasses instructions to be translated before being executed by the processor.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method for the isochronous transfer of information to a memory unit, comprising:

sending an isochronous stream of information from a memory controller directly to the memory unit, the stream being divided into a plurality of service periods of equal duration, selected service periods containing no more than a specified amount of isochronous information; and accepting said specified amount of isochronous information at said memory unit during each of said selected service periods to guarantee access to said memory unit via an isochronous pathway.

2. The method of claim 1, wherein said selected service periods have a first duration associated with asynchronous information and a second duration associated with isochronous information.

3. The method of claim 2, wherein the second duration contains asynchronous information when less than all of the second duration contains isochronous information.

4. The method of claim 2, wherein the length of the first duration is different from the length of the second duration, and the amount of information contained in the first duration is different from the amount of information contained in the second duration.

5. A method for the isochronous transfer of information from a memory unit, comprising:

sending an isochronous stream of requests from a memory controller directly to the memory unit, the stream of requests being divided into a plurality of first service periods of equal duration, selected first service periods containing no more than a specified amount of requests; and receiving said specified amount of requests at said memory unit during each of said selected service periods to guarantee access to said memory unit via an isochronous pathway.

6. The method of claim 5, wherein said selected first service periods have a first duration associated with asynchronous requests and a second duration associated with isochronous requests.

7. The method of claim 6 wherein the second duration contains asynchronous requests when less than all of the second duration contains isochronous requests.

8. The method of claim 6, wherein the length of the first duration is different from the length of the second duration, and the amount of requests contained in the first duration is different from the amount of requests contained in the second duration.

9. The method of claim 5, further comprising:

receiving an isochronous stream of information from the memory unit, the stream being divided into a plurality of second service periods.

10. The method of claim 9, wherein selected second service periods have a third duration associated with asynchronous information and a fourth duration associated with isochronous information.

11. The method of claim 10 wherein the fourth duration contains asynchronous information when less than all of the fourth duration contains isochronous information.

12. The method of claim 10, wherein the length of the third duration is different from the length of the fourth duration, and the amount of information contained in the third duration is different from the amount of information contained in the fourth duration.

13. The method of claim 9, wherein isochronous information received in a given service period is associated with an isochronous request sent a predetermined number of service periods before the given service period.

14. An apparatus to transfer isochronous information with a memory unit, comprising:

a communication port to transfer a stream of information directly to the memory unit;

a memory access controller coupled to said communication port so as to transfer the stream of information, the stream being divided into a plurality of service periods of equal duration, selected service periods containing no more than a specified amount of isochronous information; and an isochronous pathway that provides access to said memory unit by transferring said specified amount of isochronous information to said memory unit during each of said selected service periods.

15. The apparatus of claim 14, wherein each service period has a first duration associated with asynchronous information and a second duration associated with isochronous information.

16. The apparatus of claim 14, wherein said communication port is adapted to send the stream of information to the memory unit.

17. The apparatus of claim 14, wherein said communication port is adapted to receive the stream of information from the memory unit.

18. The apparatus of claim 14, wherein said memory access controller is further adapted to transfer asynchronous information in the second duration when less than all of the second duration contains isochronous information.

19. An article of manufacture comprising a machine-readable medium having stored thereon instructions adapted to be executed by a processor, the instructions which, when executed, result in the process:

transferring an isochronous stream of information from a memory controller directly to the memory unit, the stream being divided into a plurality of service periods of equal duration, selected service periods containing no more than a specified amount of isochronous information; and accepting said specified amount of isochronous information at said memory unit during each of said selected service periods to guarantee access to said memory unit via an isochronous pathway.

20. An information transfer system, comprising:

a memory unit;

a communication port to transfer a stream of information directly to said memory unit; and a memory access controller coupled to said communication port so as to transfer the stream of information, the stream being divided into a plurality of service periods of equal duration, selected service periods containing no more than a specified amount of isochronous information; and an isochronous pathway that provides access to said memory unit by transferring said specified amount of isochronous information to said memory unit during each of said selected service periods.

\* \* \* \* \*

UNITED STATES PATENT AND TRADEMARK OFFICE
CERTIFICATE OF CORRECTION

PATENT NO : 6,101,613

DATED : August 8, 2000

INVENTOR(S) : Garney et al.

It is certified that error appears in the above-identified patent and that said Letters Patent are hereby corrected as shown below:

Column 2, Line 24, change from 10 to IO;

Column 3, Line 32, change from 10 to IO;

Column 3, Line 45, change from 10 to IO;

Column 4, Line 50, change from respect. One or.., to respect. (New paragraph)
    One or..

Signed and Sealed this

Eighth Day of May, 2001

Attest:

NICHOLAS P. GODICI

Attesting Officer     Acting Director of the United States Patent and Trademark Office